US012135719B2

(12) United States Patent
Ahmed et al.

(10) Patent No.: US 12,135,719 B2
(45) Date of Patent: Nov. 5, 2024

(54) AUTOMATIC PARTITIONING OF MATERIALIZED VIEWS

(71) Applicant: Oracle International Corporation, Redwood Shores, CA (US)

(72) Inventors: Rafi Ahmed, Fremont, CA (US); Randall Bello, Austin, TX (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 175 days.

(21) Appl. No.: 17/884,917

(22) Filed: Aug. 10, 2022

(65) Prior Publication Data

US 2024/0054131 A1 Feb. 15, 2024

(51) Int. Cl.
 *G06F 16/245* (2019.01)
 *G06F 16/2453* (2019.01)
 *G06F 16/2455* (2019.01)

(52) U.S. Cl.
 CPC .. *G06F 16/24554* (2019.01); *G06F 16/24539* (2019.01)

(58) Field of Classification Search
 None
 See application file for complete search history.

(56) References Cited

U.S. PATENT DOCUMENTS

| | | | |
|---|---|---|---|
| 7,191,169 B1 | 3/2007 | Tao | |
| 8,903,803 B1* | 12/2014 | Aly | G06F 16/2264 707/964 |
| 8,996,502 B2 | 3/2015 | Folkert et al. | |
| 9,727,608 B2 | 8/2017 | Cheng et al. | |
| 11,243,956 B1 | 2/2022 | Papakonstantinou et al. | |
| 2006/0047622 A1 | 3/2006 | Folkert et al. | |
| 2007/0226264 A1 | 9/2007 | Luo et al. | |
| 2009/0319476 A1 | 12/2009 | Olston et al. | |
| 2011/0106790 A1 | 5/2011 | Gupta et al. | |
| 2014/0280029 A1 | 9/2014 | Ding et al. | |
| 2018/0239808 A1* | 8/2018 | Koochakzadeh | G06F 16/211 |
| 2019/0303486 A1* | 10/2019 | Zhuge | G06F 16/278 |

(Continued)

OTHER PUBLICATIONS

Zhou et al., "Efficient Exploitation of Similar Subexpressions for Query Processing" Proceedings of the ACM SIGMOD, International Conference on Management of Data, dated Jun. 2007, ACM, pp. 553-544.

(Continued)

*Primary Examiner* — Son T Hoang
(74) *Attorney, Agent, or Firm* — Hickman Becker Bingham Ledesma LLP

(57) ABSTRACT

In one technique, a definition of a materialized view is identified. Based on the definition, multiple candidate partitioning schemes are identified. A query is generated that indicates one or more of the candidate partitioning schemes. The query is then executed, where executing the query results in one or more partition counts, each corresponding to a different candidate partitioning scheme of the one or more candidate partitioning schemes. Based on the one or more partition counts, a candidate partitioning scheme is selected from among the plurality of candidate partitioning schemes. The materialized view is automatically partitioned based on the candidate partitioning scheme.

20 Claims, 5 Drawing Sheets

(56) References Cited

U.S. PATENT DOCUMENTS

| | | | | |
|---|---|---|---|---|
| 2019/0340265 A1* | 11/2019 | Raman | ................. | G06F 16/219 |
| 2021/0019318 A1 | 1/2021 | Leung et al. | | |
| 2022/0138260 A1* | 5/2022 | Koval | ................... | G06F 16/906 |
| | | | | 707/798 |
| 2022/0309063 A1* | 9/2022 | Du | .................... | G06F 16/24537 |
| 2022/0374407 A1* | 11/2022 | Goyal | ................ | G06F 16/2255 |
| 2023/0161795 A1* | 5/2023 | Valt | ...................... | G06F 16/278 |
| | | | | 707/802 |

OTHER PUBLICATIONS

Ahmed, et al. "Automatic Generation of Materialized Views in Oracle". Oct. 29, 2018, pp. 1-11.

Current Claims, in International Application No. PCT/US2023/021365, dated Jul. 20, 2023, 4 pages.

Theodoratos, Dimitri, et al., "Constructing search spaces for materialized view selection", DOLAP '04: Proceedings of the 7th ACM International Workshop on Data Warehousing and OLAP, pp. 112-121,Nov. 12, 2004, 10pgs.

* cited by examiner

AUTOMATIC PARTITIONING OF MATERIALIZED VIEWS

CROSS-REFERENCE TO RELATED APPLICATIONS

This application is related to application Ser. No. 16/523,872, filed Jul. 26, 2019, the entire contents of which is hereby incorporated by reference as if fully set forth herein, under 35 U.S.C. § 120.

TECHNICAL FIELD

The present disclosure relates to the field of database management and particularly to automatic partitioning of materialized views (MV).

BACKGROUND

In a database management system (DBMS), materialized views (MVs) are important features for database performance. An optimal mix of MVs minimizes resource utilization (CPU and IO) when fetching a relatively small amount of data from very large tables and increases application throughput.

Because of the importance of MVs, identifying an optimal mix of MVs is an important task. In general, identifying an optimal mix of MVs includes identifying a small number of MVs, which are of reasonable size, contain large pre-computation of joins and grouping, and can rewrite a substantial number of workload queries.

One approach for automatically generating MVs is described in U.S. patent application Ser. No. 16/523,872, which is incorporated herein by reference. This automated approach monitors workload query execution, identifies poor query performance, analyzes workload queries, and recommends, implements, verifies, and validates auto-generated MVs for improved query performance.

Given auto-generated MVs, query processing of such MVs may be improved if the MVs are partitioned. In conventional DBMSs, rows are inserted into a table without regard to any type of ordering. Consequently, when a user submits a query that selects data from the table based on a particular value or range of values, the entire table has to be scanned to ensure that all rows that satisfy the criteria are identified. Partitioning is a technique that, in certain situations, avoids the need to search an entire table or materialized view (or other database object).

With partitioning, an object, such as a database table, is divided up into sub-tables, referred to as "partitions". A common form of partitioning is referred to as range partitioning. With range partitioning, each individual partition corresponds to a particular range of values for one or more columns of the table. For example, one column of a table may store date values that fall within a particular year, and the table may be divided into twelve partitions, each of which corresponds to a month of that year. All rows that have a particular month in the date column would then be inserted into the partition that corresponds to that month. In this example, partitioning the table will increase the efficiency of processing queries that select rows based on the month contained in the date column. For example, if a particular query selected all rows where month equals January, then only the partition associated with the month of January would have to be scanned.

However, knowing how to efficiently partition a MV (especially complex MVs) is not straightforward. There are many factors to consider, the knowledge of which would require a significant amount of time to acquire for even the most skilled database administrator.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
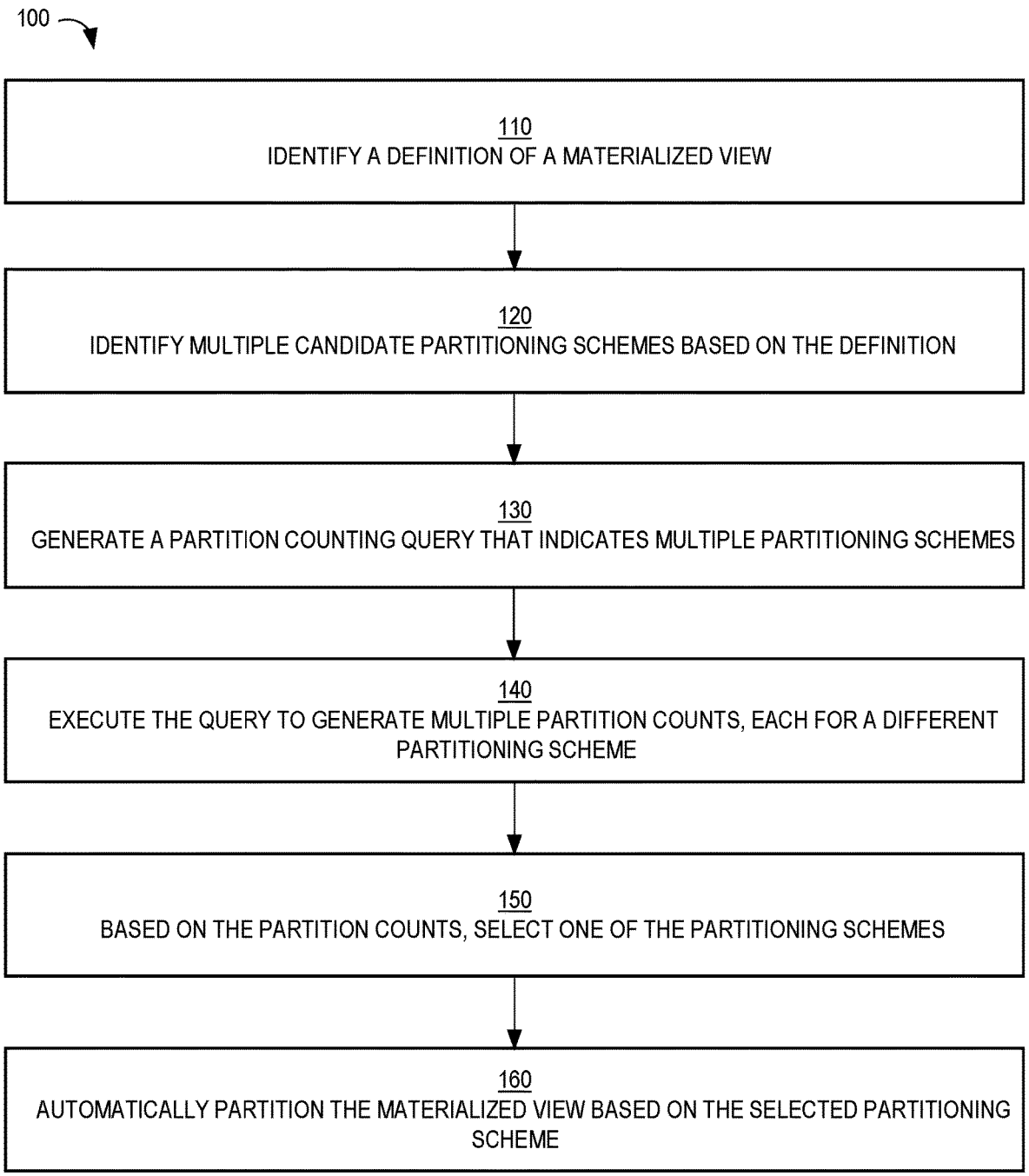
FIG. 1 is a flow diagram that depicts an example process for automatically partitioning a materialized view, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically partitioning materialized views (MVs) are provided. The MVs may have been automatically generated ("auto-MVs"). In one technique, a definition of a materialized view is identified. Based on the definition, multiple candidate partitioning schemes are identified. A partitioning scheme comprises a set of one or more columns of a particular type. For each candidate partitioning scheme, a cumulative reference count of that candidate partitioning scheme is determined. A reference count of a column of the particular type is a count of a number of query blocks where the column appears in a filter predicate. Based on the cumulative reference count of each candidate partitioning scheme, a particular candidate partitioning scheme is selected, if the partitioning scheme conforms to the constraints on user-specified partition counts. The materialized view is automatically partitioned based on the particular candidate partitioning scheme.

Embodiments improve computer-related technology pertaining to materialized views. Specifically, embodiments involve efficiently identifying a partitioning scheme for automatically partitioning MVs. Partitioned MVs reduce the time to query MVs. Also, automatic MV partitioning reduces user errors and, consequently, downtime that would result from those errors.

Primary Concepts

To assist in understanding examples processes (described herein) for automatically partitioning auto-generated MVs, the following concepts are described: join sets, set operations, types of columns, partitioning scheme, reference count (RC), cumulative RC, and cumulative NDV. These concepts will be referenced in other sections of the detailed description.

A "join set" is an abstraction of a join graph that is based on a query block (QB) of a workload query. A join set is a set of join edges and has an associated field, referred to as a QB set, which represents a set of QBs that can be potentially rewritten in terms of a MV based on the join set. For the sake of brevity, a join set may be represented as a set of simplified join edges that do not show columns or relational operators: for example, {F1-D1, D1-B1}, where "F1-D1" stands for a join edge between tables F1 and D1 and "D1-B1" stands for a join edge between tables D1 and B1.

"Set operations" are performed on join sets. Examples of set operations include equivalence, subset, superset, union, and intersection. Application of set operations may result in the augmentation of QB sets and creation of new join sets.

A join set can be associated with multiple QBs. For example, [{F1-D1, F1-D3, D1-B1}, {Q3, Q5, Q8, Q11}] indicates that an MV based on this join set can potentially rewrite the query blocks Q3, Q5, Q8, and Q11.

For each non-aggregate column on the SELECT list of an auto-MV, two types of QB reference counts may be maintained. A column can be of multiple types. These types are based on the properties of query blocks in the QB set associated with the join set upon which the auto-MV is based. One type of column is referred to as type F, which means that the column appears on a filter predicate of a query block in the QB set of a MV. Another type of column is referred to as type J, which means that the column appears on the join predicate of a query block in the QB set of a MV.

A "partitioning scheme" is a set of one or more columns of type F (referred to as "partitioning columns") and a partitioning method, such as list, range, or hash.

A "reference count" (RC) of a column of type F represents the count of query blocks where the column appears in filter predicates of those query blocks. If a column C on the SELECT list of an auto-MV, which is based on the join set [{F1-D2, F1-D3}, {Q3, Q5, Q8, Q11}], appears in the filter predicates of Q3, Q8, and Q11, then the reference count of column C is 3. The higher the reference count the better. A high reference count of a column means that if a MV is partitioned on that column, then the filter predicate in the corresponding query blocks will benefit from partition pruning. In the example above, query block Q5 will not benefit from partition pruning based on reference column C since Q5 does not have a filter predicate on column C. A goal in partitioning is to achieve the highest cumulative reference count that does not exceed a partition count limit.

A "cumulative reference count" (CRC) of a partitioning scheme is the sum of the reference counts (RCs) of partitioning columns in the partitioning scheme. For example, the cumulative reference count of partitioning scheme (x, y, z)=RC(x)+RC(y)+RC(z).

A "cumulative NDV" (or CNDV) of a partitioning scheme is the product of the number of distinct values (NDVs) of columns in the partitioning scheme. The partitioning count of a partitioning scheme cannot exceed its CNDV.

Overview of a Partitioning Strategy

For auto-partitioning, only the columns of type F are considered. Columns of type F enable static partition pruning in query blocks that are rewritten with an MV. The list partitioning method is used for MVs.

A hash partitioning method may be used to partition a MV if a partitioning column has equality filter predicates and the partitioning scheme comprises only one partitioning column. For hash partitioning, a desired number of partitions can be explicitly specified. An example of an explicit query phrase for specifying a desired number of partitions is "partition by HASH (T1.b1) partitions 16," where T1.b1 refers to column b1 of table T1 and 16 is the desired number of partitions.

A partitioning decision is made for recommended auto-MVs after the auto-MVs have been automatically selected by an MV advisor and before the auto-MVs undergo verification by a verification module. Therefore, auto-partitioned auto-MVs may be verified before publication (or use by a query processor).

For a single-column partitioning scheme, the number of distinct values (NDV) of the column may be used as an approximation for the count of partitions.

The combinations of a given set of partitioning columns generate different partitioning schemes. For example, for three columns A, B, and C, all their combinations (i.e., {A}, {B}, {C}, {A, B}, {A, C}, {B, C}, {A, B, C}) represent different partitioning schemes.

In general, more partitioning columns lead to a larger CRC and a higher partition count.

An auto-partitioning algorithm may be cognizant of the upper bounds on the number of partitioning columns and on the number of partitions (i.e., "partition count"). A relatively small partition count is not considered optimal because the resulting partitions may be too large to provide much benefit from partition pruning. A user, such as a database administrator, may override the default values of these two upper bounds.

An objective of an auto-partitioning algorithm may be to select a partitioning scheme that maximizes the CRC within the constraints of the two upper bounds. A higher CRC means that more query blocks that are rewritten with the MV will benefit from more effective static partition pruning.

Process Overview

FIG. 1 is a flow diagram that depicts an example process 100 for automatically partitioning a MV, in an embodiment. Process 100 may be performed by a database server that has access to metadata of database objects (e.g., tables) upon which a materialized view is based.

At block 110, a definition of a materialized view is identified. The definition may have been automatically generated or may have been manually specified (or "user defined"). The definition includes references to tables and columns and, optionally, a predicate clause and/or a group-by clause. Process 100 may be triggered by a notification that one or more MVs have just been generated and are, therefore, candidates for partitioning. Additionally or alternatively, process 100 may be triggered by a notification that one or more base tables upon which the MV is based have changed significantly (e.g., a certain number of new rows, deleted rows, and/or modified rows), which may necessitate a re-partitioning of the MV.

At block 120, multiple candidate partitioning schemes are identified based on the definition. A candidate partitioning scheme comprises a set of one or more columns and a partitioning method, such as list partitioning or hash partitioning.

Block 120 may involve identifying query blocks that are associated with the MV and determining whether there are any columns that appear in filter predicates on the query blocks. Such columns are candidates from which to identify candidate partitioning schemes. For example, if there are two candidate columns that may be used to partition, then there may be up to three candidate partitioning schemes: one candidate partitioning scheme for one of the two columns, one candidate partitioning scheme for one of the other two columns, and one candidate partitioning scheme for the two columns together. Thus, these three candidate partitioning schemes correspond to three combinations of the set of two columns.

At block 130, a partition counting query that indicates the partition count for each candidate partitioning scheme is generated. The partition counting query may be a SQL query that includes a SELECT clause and a FROM clause. The partition counting query also includes a portion of the definition of the MV. The partition counting query may include a grouping set clause, as described in more detail herein. The partition counting query may comprise multiple individual SQL queries, each corresponding to a different partitioning scheme.

At block 140, the partition counting query is executed, which results in generating a plurality of partition counts, each corresponding to a different candidate partitioning scheme. (In the embodiment where multiple partition counting queries are generated, block 140 would involve executing each one of them.) Block 140 may involve a database server executing the partition counting query against metadata of a plurality of database objects, such as tables. The metadata may include, for each column of a candidate partitioning scheme, a number of distinct values in the column. A partition count of a candidate partitioning scheme indicates a number of partitions that might result from partitioning the MV according to the candidate partitioning scheme.

At block 150, based on the partition counts, one of the candidate partitioning schemes is selected. For example, the candidate partitioning scheme with the highest partition count is selected. As another example, the candidate partitioning scheme with the highest partition count that does not exceed a partition count threshold is selected. As another example, the candidate partitioning scheme that has the highest partition count and that satisfies one or more other criteria is selected.

Block 150 may involve considering the candidate partitioning schemes in a particular order, such as candidate partitioning schemes associated with larger cumulative reference counts. Then, for each candidate partitioning scheme, one or more criteria are checked for being satisfied. Once a candidate partitioning scheme is determined to satisfy the one or more criteria, that candidate partitioning scheme is selected and any remaining candidate partitioning schemes are ignored. This approach can save in computer resources (e.g., CPU and computer memory) and time by avoiding the analysis of candidate partitioning schemes that are unlikely to be better than candidate partitioning schemes that have already been considered.

At block 160, the materialized view is automatically partitioned based on the selected candidate partitioning scheme. The partitioning method of the selected candidate partitioning scheme may be list partitioning or hash partitioning.

Identifying Candidate Partitioning Schemes

Given a MV definition, multiple columns of type F are identified. In an embodiment where an MV definition is in SQL, the columns are identified in a SELECT clause of the MV definition. Also, given the MV definition, a set of query blocks is identified. In an embodiment, an MV definition is based on a join set, which is associated with a QB set (i.e., a set of query blocks). For each identified column, it is determined whether the column appears in a filter predicate of a query block in the set of query blocks. (In other words, columns of type F are identified.) If this determination is in the affirmative, then column data (which may initially be empty or NULL) is updated to identify the column. Once each identified column is checked in this way, the column data identifies a set of zero or more columns and their reference counts. If the column data does not identify any columns (e.g., the column data is empty or NULL), then no partitioning is possible for the MV.

If the column data identifies a single column, then there may be multiple partitioning schemes, but their difference would only be in partitioning method (e.g., list or hash). Then, the number of distinct values (NDV) in the column is determined, for example, by checking metadata of a table to which the column belongs. If the NDV of the column is not available, then a query may be issued in order to compute the NDV. This NDV may be used as the partition count of the MV, unless other criteria are not satisfied, as described in more detail herein.

In the scenario where the column data identifies multiple columns, multiple combinations from the identified columns are generated. For example, if columns C1 and C2 are identified, then the following three combinations are generated: {C1}, {C2}, {C1, C2}. As another example, if columns C1, C2, and C3 are identified, then the following seven combinations are generated: {C1}, {C2}, {C3}, {C1, C2}, {C1, C3}, {C2, C3}, {C1, C2, C3}. Each combination corresponds to a different partitioning scheme. Some combinations may correspond to multiple partitioning schemes, each of which corresponds to a different partitioning method. For example, partitioning scheme 1 (S1) may comprise partitioning column {C1} where the partitioning method is list, partitioning scheme 2 (S2) may comprise partitioning column {C1} where the partitioning method is hash. In an embodiment, hash partitioning is preferred for partitioning schemes that only have one partitioning column and where all filter predicates on the partitioning column in the underlying query blocks of the MV are equality.

In the scenario where the column data identifies multiple columns, the columns may be ordered based on reference count from highest reference count to lowest reference count. For example, if there are columns A, B, and C and B has the highest reference count and A has the lowest reference count, then the columns are ordered as follows: B, C, A.

Partition Counting Query

As indicated above, a partition counting query may be generated and, when executed, used to generate a partition count for each of multiple candidate partitioning schemes. In an embodiment, a single partition counting query is used to efficiently estimate the counts of multiple partitioning schemes.

The following is an example definition of an unpartitioned MV named MV2, where only F.a, D2.b, and D3.c have reference counts greater than zero:

```
CREATE MATERIALIZED VIEW MV2 ENABLE QUERY REWRITE
AS
SELECT F.k1, D2.b, D3.c, F.a, SUM(F.m) sm, COUNT(F.m) cn
FROM F, D2, D3
WHERE F.k2 = D2.k2 and F.k3 = D3.k3
GROUP BY F.k1, D2.b, D3.c, F.a;
```

In response to identifying MV2, a process (e.g., a database server process responsible for partitioning MVs) constructs a partition counting query that, when executed, generates partition counts of each combination of partitioning columns, which, in this example, are: {F.a}, {D2.b}, {D3.c}, {F.a, D2.b}, {F.a, D3.c}, {D2.b, D3.c}, and {F.a, D2.b, D3.c}. An example of such a partition counting query is a GROUPING SET query is as follows:

```
SELECT GID, COUNT(*) PartCount
FROM (SELECT GROUPING_ID(F.a, D2.b, D3.c) GID
    FROM F, D2, D3
    WHERE F.k2 = D2.k2 and F.k3 = D3.k3
    GROUP BY GROUPING SETS ((F.a), (D2.b), (D3.c), (F.a, D2.b),
    (F.a, D3.c), (D2.b, D3.c), (F.a, D2.b, D3.c))
GROUP BY GID;
```

In this example, the order of columns specified in GROUPING_ID( ) is significant, but order is not significant in the GROUPING SET clause. In this example, GROUPING_ID (GID) represents a partitioning scheme. GID is a decimal representation of a bit vector, which has 0 for a present column and 1 for an absent column. For GROUPING_ID (F.a, D2.b, D3.c), GSQ1 may return the following 7 rows: [0, 1984], [1, 130], [2, 173], [3, 11], [4, 1889], [5, 130], and [6, 19], where the first number refers to a partitioning scheme and the second number refers to a partition count. GID 0 (i.e., 0 0 0) represents the partitioning scheme {F.a, D2.b, D3.c}, which has the partition count of 1984; GID 1 (i.e., 0 0 1) represents the partitioning scheme {F.a, D2.b}, which has the partition count of 130; GID 6 (i.e., 1 1 0) represents the partitioning scheme of {D3.c}, which has the partition count of 19; and so on.

In an embodiment, one or more of the tables in the FROM clause of the MV definition may be sampled during execution of a corresponding partition counting query. For example, in the above partition counting query, the FROM clause may be replaced with the following clause, "FROM F sample block(20), D2, D3," which means that 20% of the blocks of table F are accessed during the execution of the query. In the case of sampling (during execution of a partition counting query) one or more tables that include a partitioning column, any partition count that is generated from sampled data is an estimated value.

Reduced Partition Count

In some situations, a partition count for a partitioning scheme exceeds an upper bound or threshold. An upper bound is a number that indicates that a partition count beyond that number is likely to have costs that exceed the benefits of partitioning. Costs may come in the form of increased partition maintenance and even query processing. An upper bound may be a default value. Additionally or alternatively, the upper bound may be defined by a database administrator.

In an embodiment, instead of disregarding a partitioning scheme whose partition count exceeds an upper bound, it is determined whether the partition count may be reduced. A function may be defined that takes, as input, a partitioning scheme (or set of partitioning columns) and a partition count of that partitioning scheme. In return, the function computes a reduced partition count, when possible. In order to qualify for partition count reduction, one or more of the partitioning columns must be candidates for having virtual columns (described in more detail herein) generated for them. The following is example pseudo code of a function ("ReducedPartCount") for reducing a partition count ("PartCount") of a partitioning scheme (S), where ndv(C) returns the number of distinct values of column C and DPC is a desired partition count (which may be a default value):

```
Function ReducedPartCount (S, PartCount)
{
  prNdv := 1;          /* product of all column NDVs; CNDV */
  prLgNdv := 1;        /* product of reduced NDVs of columns */
  prNoLgNdv := 1;      /* product of non-reduced NDVs of columns */
  For each column C in S do
  {
    prNdv := prNdv * ndv(C);
    /* the next check is whether a virtual column can be built for column
    C and the NDV of C is greater than the desired partition count
    (DPC)*/
    if (ValidSOIHB(C) AND ndv(C) > DPC) then
    {
      Mark C for SOIHB;
      prLgNdv := prLgNdv * DPC; /* reduction with SOIHB for C */
    }
    else
      prNoLgNdv := prNoLgNdv * ndv(C); /* no reduction for C */
  }
  /* Return the reduced partition count for S. */
  return ((PartCount * prNoLgNdv * prLgNdv) / prNdv);
}
```

In this example code, ValidSOIHB(C) returns TRUE if a virtual column can be generated for column C, as further described herein. Also, the variable prNdv keeps track of the product of the number of distinct values of all the columns in partitioning scheme S (also referred to as CNDV), while the variable prLgNdv keeps track of the product of DPC of all the columns (in S) for which a virtual column definition is possible, while the variable prNoLgNdv keeps track of the product of the number of distinct values of all columns (in S) for which a virtual column definition is not possible.

Virtual Columns

If the partition count (whether estimated or not) of a partitioning scheme containing column C exceeds the upper bound of a partition count, then a virtual column may be defined on column C (e.g., by using a database function), where the virtual column can be used to potentially limit the partition count to a desired number.

An example of a function that creates a virtual column based on an existing column is SYS_OP_INTERVAL_HIGH_BOUND (or "SOIHB" for short), which takes, as input, the name of the column, an interval size, and a normalized low value. The function maps each value in the named column (e.g., "T.col") to another value in order to achieve a desired partition count (DPC), which may be internally set to a small number. For example, values 0-99 in T.col are mapped to 0, values 100-199 in T.col are mapped to 1, and so forth. The value of interval size can be calculated using DPC, a normalized high value for the column, and a normalized low value for the column. The equation may be as follows:

$$\text{Interval Size} = (\text{NormHighVal}(T.\text{col}) - \text{NormLowVal}(T.\text{col}))/\text{DPC};$$

NormHighVal( ) and NormLowVal( ) return the normalized highest and lowest values of T.col respectively. A normalized value or normalization is used for columns that have a data type other than number; for example, a column of data type 'Date' is converted into a column of data type number, so that the column's low and high values can be computed, as well as the interval size. These values may be maintained as part of optimizer statistics.

Regardless of how a virtual column may be defined (whether using SYS_OP_INTERVAL_HIGH_BOUND or another function), that virtual column may be used to list partition an MV. Virtual column is not needed for hash partitioning because hash partitioning allows the specification of a number of partitions. This ensures that partitions generated by the virtual column will not exceed the DPC.

In an embodiment, a virtual column generator operates on columns that have a data type of number or date. If a column has a data type of varchar (or variable character), then another computer process may be first used to convert the varchar values into numbers and then the virtual column generator operates on those values.

If one or more virtual columns are generated in order to reduce the partition count of a partitioning scheme, then the MV definition is updated to reference the one or more virtual columns in order to allow for the declaration of the one or more virtual columns. The following is an example MV definition for MV1, which has virtual columns VB3 and VA defined over SOIHB, a list partitioning method, and virtual and regular columns:

```
CREATE MATERIALIZED VIEW MV1
  VIRTUAL COLUMNS (
    VB3 AS (SYS_OP_INTERVAL_HIGH_BOUND(D3.B3, 27, 1),
    VA AS (SYS_OP_INTERVAL_HIGH_BOUND(F.A, 15, 0))
  PARTITION BY LIST (D2.B2, VB3, VA) AUTOMATIC
    (PARTITION P0 VALUES(null, null, null))
  enable query rewrite AS
SELECT D3.B3, D3.C3, F.A, D2.B2, SUM(F.C) sm, COUNT(F.M) cn
FROM F, D2, D3
WHERE F.k3 = D3.k3 and F.k2 = D2.k2
GROUP BY D3.B3, D3.C3, D2.B2, F.A, D3.B3;
```

Detailed Auto-Partitioning Algorithm

Figure 2A:
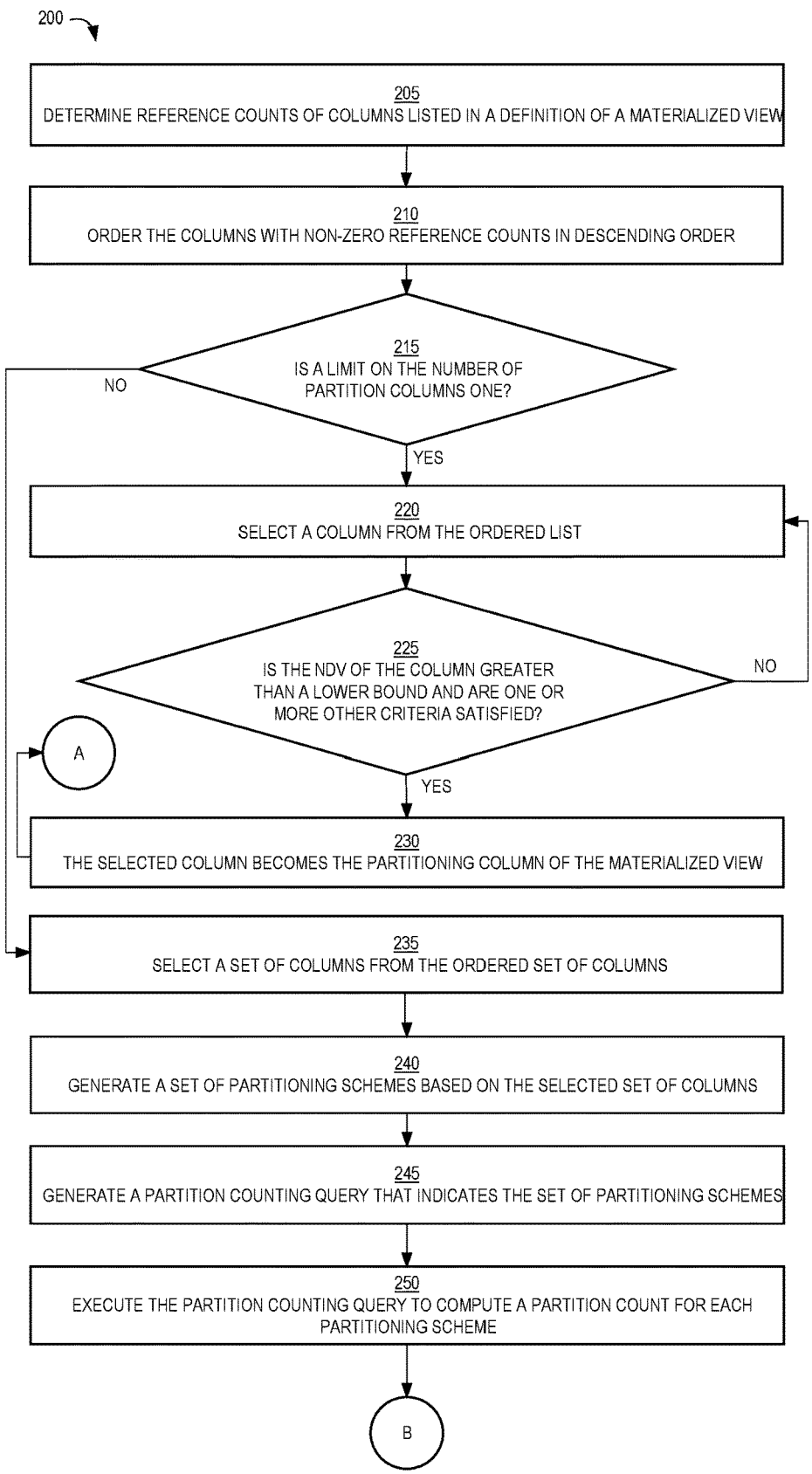
FIGS. 2A-2B are a flow diagram that depicts an example process for auto-partitioning a materialized view, in an embodiment.
Figure 2B:
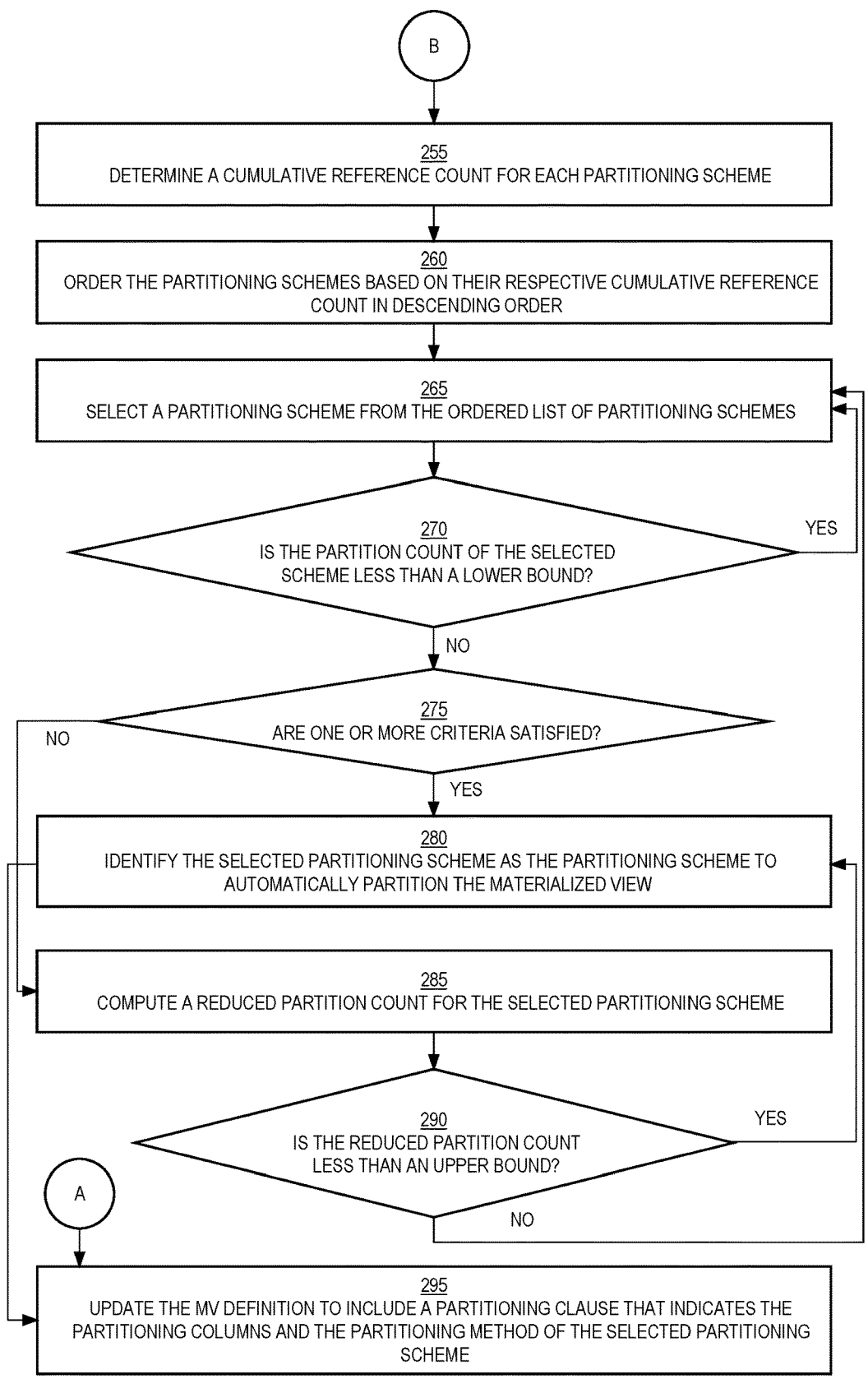

FIGS. 2A-2B are a flow diagram that depicts an example process 200 for auto-partitioning a materialized view, in an embodiment. Although the blocks of process 200 are depicted and described in a particular order, other orders are possible.

At block 205, reference counts of columns listed in a MV definition are determined. The columns that are analyzed may be limited to the columns in a SELECT clause of the MV definition and that are found in filter predicates of query blocks to which the MV is rewritten.

At block 210, the columns with non-zero reference counts are ordered in descending order. This ordering ensures that the columns that have the highest chance of producing the most partitions are considered first.

At block 215, it is determined whether a limit on the number of partition columns is one. (This limit may be a default limit and may be modified by a user, such as a database administrator.) If so, then process 200 proceeds to block 220; otherwise, process 200 proceeds to block 235.

At block 220, the first/next column from the ordered list is selected. If this is the first iteration of block 220, then the column selected has the highest reference count. If this is the second iteration of block 220, then the column selected has the second highest reference count or a reference count that is equal to the reference count of the first selected column (if multiple columns have the same reference count).

At block 225, it is determined whether the number of distinct values of the selected column is greater than (or equal to) a lower bound and whether one or more other criteria are satisfied. The lower bound may be a default value and may be adjusted by a system (or database) administrator. The lower bound represents a minimum number of partitions below which the costs of partitioning likely outweigh any benefits from partition pruning.

Examples of one or more other criteria being satisfied is whether the number of distinct values of the selected column is less than (or equal to) an upper bound, whether a virtual column may be generated from the selected column, or whether the selected column can be hash partitioned. As described previously, a selected column can be hash partitioned if it is the only column in an MV that is being partitioned and all filter predicates on the selected column in the underlying query blocks are equality.

The one or more other criteria may be one, two, or three of these three criteria. If the one or more other criteria are two or more criteria, then the satisfaction of any of the two or more criteria may be sufficient for block 225 resulting in the affirmative.

If block 225 results in the affirmative, then process 200 proceeds to block 230. Otherwise, process 200 returns to block 220. However, if all columns have been considered and there are no more columns to select, then process 200 ends without auto-partitioning.

At block 230, the selected column becomes the partitioning column of a partitioning scheme of the MV. If block 230 is considered, one or more columns in the ordered list of columns might not have been considered. For example, the selected column in 230 may have been the first column selected from the ordered list and the ordered list of columns may have listed multiple columns. If block 230 is performed, then process 200 skips to block 295.

At block 235, a set of columns is selected from the top of the ordered list of columns. The number in the set of columns is either the upper bound on the number of partitioning columns or less, in which case the number of columns in the ordered list of columns is less than that upper bound. For example, if the upper bound is four and the number of columns in the ordered list is three, then all the columns in the ordered list are selected. On the other hand, if the upper bound is four and the number of columns in the ordered list is five, then the first four columns in the ordered list are selected.

At block 240, a set of partitioning schemes is generated based on the selected set of columns. Block 240 involves generating all possible combinations of partitioning columns. If list and range are options, then it is possible to have two partitioning schemes with the same partitioning columns but different partitioning methods.

At block 245, a partition counting query is generated that indicates the set of partitioning schemes. An example of a partition counting query is a grouping set query that includes a grouping set clause that identifies each partitioning scheme in the set of partitioning schemes.

At block 250, the partition counting query is executed to compute a partition count for each partitioning scheme. Block 250 may involve identifying the number of distinct values for each partitioning column in a partitioning scheme and, if there are multiple partitioning columns in the partitioning scheme, multiplying those numbers together to result in a partition count for that partitioning scheme.

At block 255, a cumulative reference count of each partitioning scheme is determined. Block 255 may be performed sometime before block 250. Block 255 may involve determining the reference count (as defined herein) of each partitioning column in a partitioning scheme and, if there are multiple partitioning columns in the partitioning scheme, totaling or summing the reference counts to result in a cumulative reference count for that partitioning scheme.

At block 260, the partitioning schemes are ordered based on their respective cumulative reference counts in descending order. Thus, the partitioning scheme that has the highest cumulative reference count is first, the partitioning scheme that has the second highest cumulative reference count is second, and so forth.

At block 265, a partitioning scheme is selected from the ordered list of partitioning schemes. The first iteration of 265 for a particular MV involves selecting the first partitioning scheme in the ordered list. The second iteration of 265 for the particular MV involves selecting the second partitioning scheme in the order list, and so forth.

At block 270, it is determined whether the partition count of the selected partitioning scheme is less than a lower bound or more than the upper bound, which may be a default value. If so, then process 200 returns to block 265 where the next partitioning scheme is selected; otherwise, process 200 proceeds to block 275. However, if there are no more partitioning schemes to select, then process 200 ends without determining a partitioning scheme for the MV.

At block 275, it is determined whether one or more criteria are satisfied. Example criteria include (a) the partition count of the selected partitioning scheme being less than (or equal to) an upper bound and (b) hash partitioning being available for the selected partitioning scheme. Hash partitioning is available for a partitioning scheme if there is only one partitioning column in the partitioning scheme and all filter predicates on the partitioning column in the underlying query blocks are equality. If one of these criteria is satisfied, then the determination in block 275 is in the affirmative. If the determination in block 275 is in the affirmative, then process 200 proceeds to block 280; otherwise, process 200 proceeds to block 285.

At block 280, the selected partitioning scheme is identified as the partitioning scheme to use to auto-partition the MV. If block 280 is performed, then process 200 skips to block 295.

At block 285, a reduced partition count is computed for the selected partitioning scheme. The reduced partition count algorithm described herein may be used to compute the reduced partition count based on the partition count that was previously computed for the selected partitioning scheme.

At block 290, it is determined whether the reduced partition count is less than (or equal to) the upper bound. If so, then process 200 returns to block 280; otherwise, process 200 returns to block 265 where the next partitioning scheme is selected. However, if there are no more partitioning schemes to select, then process 200 ends without determining a partitioning scheme for the MV.

At block 295, the MV is auto-partitioned based on the partitioning method of the selected partitioning scheme and based on the partitioning column(s) of the selected partitioning scheme. If one or more partitioning columns were marked for virtual column creation, then those one or more virtual columns are created and used to partition the MV.

Block 295 may involve, first, updating the MV definition to include a partitioning clause that indicates the partitioning columns and the partitioning method of the selected partitioning scheme and, second, executing (e.g., by a database server) the updated MV definition. An example of an updated MV definition is MV1 provided herein. As in that example, if, in the process of identifying a partitioning scheme to use to auto-partition the MV, one or more partitioning columns were marked for virtual column creation (e.g., in the reduced partition count), then the MV definition is also updated to reference one or more virtual columns.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
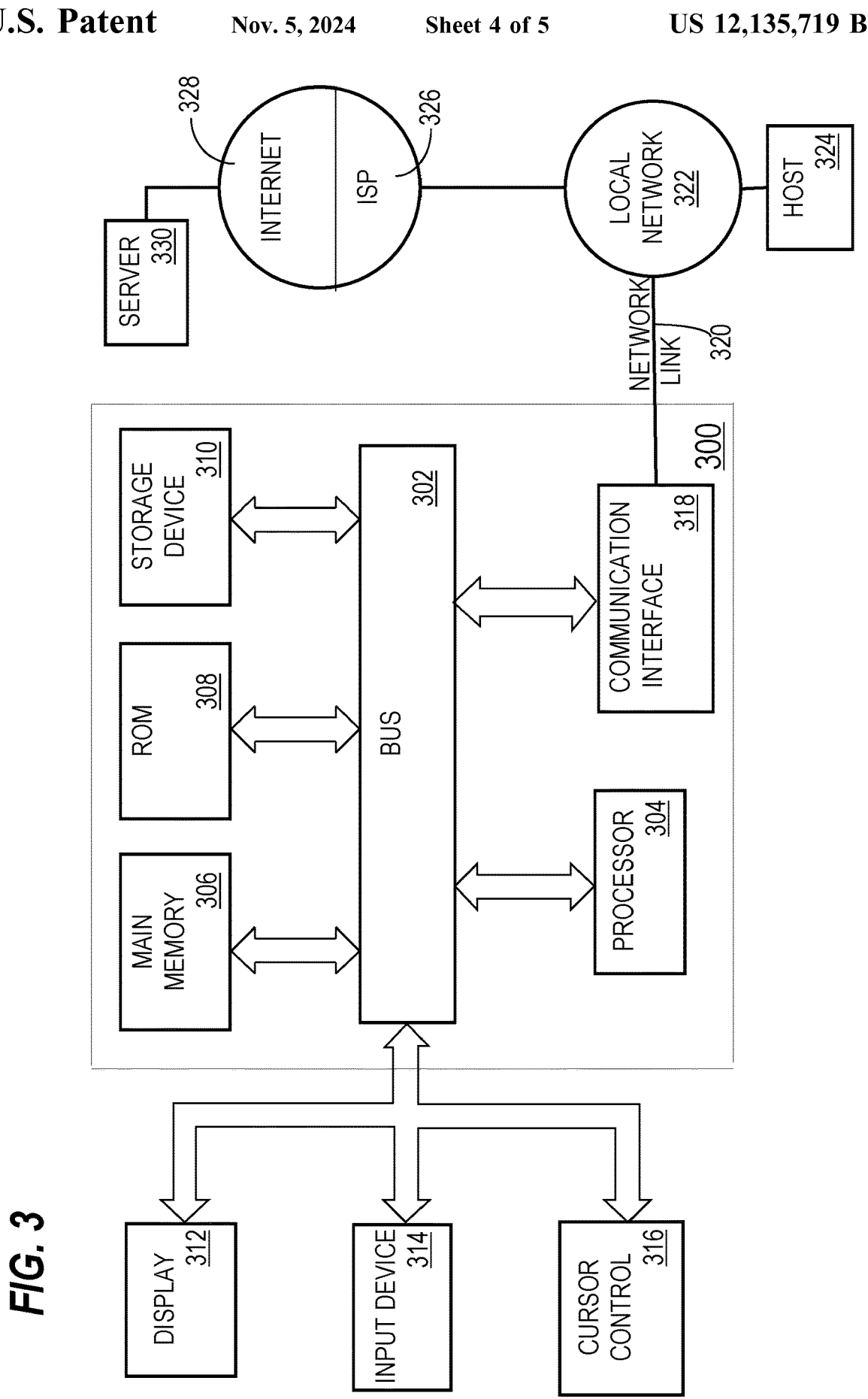
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

Figure 4:
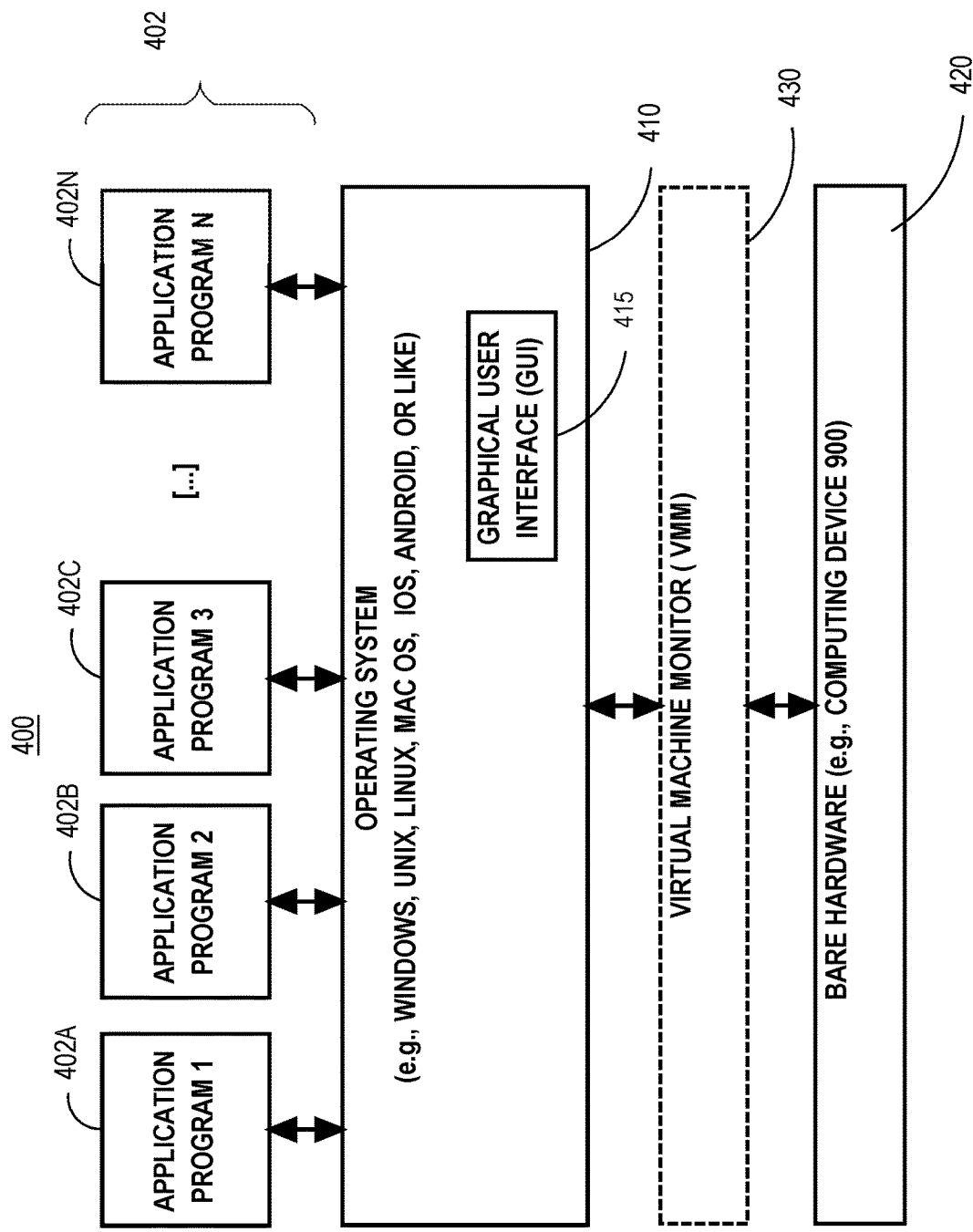
FIG. 4 is a block diagram of a basic software system that may be employed for controlling the operation of the computer system.

FIG. 4 is a block diagram of a basic software system 400 that may be employed for controlling the operation of computer system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying a definition of a materialized view that contains a result of a particular query, wherein the definition indicates one or more columns of one or more base tables;
    based on the definition, identifying a plurality of candidate partitioning schemes;

generating a query that indicates one or more candidate partitioning schemes in the plurality of candidate partitioning schemes;

executing the query, wherein executing the query results in one or more partition counts, each corresponding to a different candidate partitioning scheme of the one or more candidate partitioning schemes;

based on the one or more partition counts, selecting a candidate partitioning scheme from among the plurality of candidate partitioning schemes;

automatically partitioning the materialized view based on the candidate partitioning scheme;

storing the partitioned materialized view on physical storage media;

wherein the method is performed by one or more computing devices.

2. The method of claim 1, wherein identifying the plurality of candidate partitioning schemes comprises:

identifying, in a SELECT list of the definition, a plurality of columns that have a filter predicate in a query block that is associated with the materialized view;

identifying a plurality of combinations of the plurality of columns;

wherein identifying the plurality of candidate partitioning schemes is based on the plurality of combinations.

3. The method of claim 1, wherein the materialized view is a first materialized view, the method further comprising:

identifying a second definition of a second materialized view that is different than the first materialized view;

based on the second definition, identifying a second plurality of candidate partitioning schemes, wherein each candidate partitioning scheme in the second plurality of candidate partitioning schemes comprises a single column;

determining whether a number of distinct values in a column of a particular candidate partitioning scheme in the second plurality of candidate partitioning schemes is greater than a lower bound and one or more criteria are satisfied;

in response to determining that the number of distinct values is greater than the lower bound and the one or more criteria are satisfied, selecting the particular candidate partitioning scheme from among the second plurality of candidate partitioning schemes;

wherein the one or more criteria comprises:
the number of distinct values being less than an upper bound,
it is possible to define a virtual column from the column, or
hash partitioning is a valid partitioning method for the column;

automatically partitioning the second materialized view based on the particular candidate partitioning scheme.

4. The method of claim 1, wherein the query is a grouping set query that is based on the definition of the materialized view and includes a grouping set clause.

5. The method of claim 1, further comprising:
determining whether the partition count of the candidate partitioning scheme is greater than a lower bound and whether one or more first criteria are satisfied;
in response to determining that the partition count of the candidate partitioning scheme is greater than the lower bound and that the one or more first criteria are satisfied, selecting the candidate partitioning scheme.

6. The method of claim 1, further comprising:
determining whether one or more first criteria are satisfied, wherein the one or more first criteria comprises:
the partition count of the candidate partitioning scheme is less than an upper bound; or
the candidate partitioning scheme has only one column and all filter predicates associated with the one column in underlying query blocks of the materialized view are equality.

7. The method of claim 1, further comprising:
in response to determining that the partition count of the candidate partitioning scheme is not less than an upper bound, generating, based on the partition count, a reduced partition count;
determining whether the reduced partition count is less than the upper bound.

8. The method of claim 7, further comprising:
in response to determining that the partition count is not less than the upper bound, determining whether a number of distinct values of a column of the candidate partitioning scheme is greater than a desired partition count;
in response to determining that number of distinct values of the column of the candidate partitioning scheme is greater than the desired partition count, determining that the column is a candidate for generating a virtual column;
updating the definition of the materialized view to reference the virtual column.

9. The method of claim 1, further comprising:
for each candidate partitioning scheme of the plurality of candidate partitioning schemes, determining a cumulative reference count of said each candidate partitioning scheme;
prior to selecting the candidate partitioning scheme, ordering the plurality of candidate partitioning schemes based on descending cumulative reference counts of the plurality of candidate partitioning schemes;
wherein selecting the candidate partitioning scheme is performed without comparing a partition count of one or more other candidate partitioning schemes, in the plurality of candidate partitioning schemes, with an upper bound or a lower bound.

10. The method of claim 1, wherein:
the query indicates a sample of a table that is indicated in the definition of the materialized view;
each partition count of the one or more partition counts is an estimated partition count.

11. One or more non-transitory storage media storing instructions which, when executed by one or more computing devices, cause:
identifying a definition of a materialized view that contains a result of a particular query, wherein the definition indicates one or more columns of one or more base tables;
based on the definition, identifying a plurality of candidate partitioning schemes;
generating a query that indicates one or more candidate partitioning schemes in the plurality of candidate partitioning schemes;
executing the query, wherein executing the query results in one or more partition counts, each corresponding to a different candidate partitioning scheme of the one or more candidate partitioning schemes;
based on the one or more partition counts, selecting a candidate partitioning scheme from among the plurality of candidate partitioning schemes;

automatically partitioning the materialized view based on the candidate partitioning scheme;

storing the partitioned materialized view on physical storage media.

12. The one or more non-transitory storage media of claim 11, wherein identifying the plurality of candidate partitioning schemes comprises:

identifying, in a SELECT list of the definition, a plurality of columns that have a filter predicate in a query block that is associated with the materialized view;

identifying a plurality of combinations of the plurality of columns;

wherein identifying the plurality of candidate partitioning schemes is based on the plurality of combinations.

13. The one or more non-transitory storage media of claim 11, wherein the materialized view is a first materialized view, wherein the instructions, when executed by the one or more computing devices, further cause:

identifying a second definition of a second materialized view that is different than the first materialized view;

based on the second definition, identifying a second plurality of candidate partitioning schemes, wherein each candidate partitioning scheme in the second plurality of candidate partitioning schemes comprises a single column;

determining whether a number of distinct values in a column of a particular candidate partitioning scheme in the second plurality of candidate partitioning schemes is greater than a lower bound and one or more criteria are satisfied;

in response to determining that the number of distinct values is greater than the lower bound and the one or more criteria are satisfied, selecting the particular candidate partitioning scheme from among the second plurality of candidate partitioning schemes;

wherein the one or more criteria comprises:
   the number of distinct values being less than an upper bound,
   it is possible to define a virtual column from the column, or
   hash partitioning is a valid partitioning method for the column;

automatically partitioning the second materialized view based on the particular candidate partitioning scheme.

14. The one or more non-transitory storage media of claim 11, wherein the query is a grouping set query that is based on the definition of the materialized view and includes a grouping set clause.

15. The one or more non-transitory storage media of claim 11, wherein the instructions, when executed by the one or more computing devices, further cause:

determining whether the partition count of the candidate partitioning scheme is greater than a lower bound and whether one or more first criteria are satisfied;

in response to determining that the partition count of the candidate partitioning scheme is greater than the lower bound and that the one or more first criteria are satisfied, selecting the candidate partitioning scheme.

16. The one or more non-transitory storage media of claim 11, wherein the instructions, when executed by the one or more computing devices, further cause:

determining whether one or more first criteria are satisfied, wherein the one or more first criteria comprises:
   the partition count of the candidate partitioning scheme is less than an upper bound; or
   the candidate partitioning scheme has only one column and all filter predicates associated with the one column in underlying query blocks of the materialized view are equality.

17. The one or more non-transitory storage media of claim 11, wherein the instructions, when executed by the one or more computing devices, further cause:

in response to determining that the partition count of the candidate partitioning scheme is not less than an upper bound, generating, based on the partition count, a reduced partition count;

determining whether the reduced partition count is less than the upper bound.

18. The one or more non-transitory storage media of claim 17, wherein the instructions, when executed by the one or more computing devices, further cause:

in response to determining that the partition count is not less than the upper bound, determining whether a number of distinct values of a column of the candidate partitioning scheme is greater than a desired partition count;

in response to determining that number of distinct values of the column of the candidate partitioning scheme is greater than the desired partition count, determining that the column is a candidate for generating a virtual column;

updating the definition of the materialized view to reference the virtual column.

19. The one or more non-transitory storage media of claim 11, wherein the instructions, when executed by the one or more computing devices, further cause:

for each candidate partitioning scheme of the plurality of candidate partitioning schemes, determining a cumulative reference count of said each candidate partitioning scheme;

prior to selecting the candidate partitioning scheme, ordering the plurality of candidate partitioning schemes based on descending cumulative reference counts of the plurality of candidate partitioning schemes;

wherein selecting the candidate partitioning scheme is performed without comparing a partition count of one or more other candidate partitioning schemes, in the plurality of candidate partitioning schemes, with an upper bound or a lower bound.

20. The one or more non-transitory storage media of claim 11, wherein:

the query indicates a sample of a table that is indicated in the definition of the materialized view;

each partition count of the one or more partition counts is an estimated partition count.

* * * * *